(12) United States Patent
Ougouag et al.

(10) Patent No.: US 11,508,488 B2
(45) Date of Patent: Nov. 22, 2022

(54) HEAT TRANSFER SYSTEMS FOR NUCLEAR REACTOR CORES, AND RELATED SYSTEMS

(71) Applicant: Battelle Energy Alliance, LLC, Idaho Falls, ID (US)

(72) Inventors: Abderrafi Mohammed El-Amine Ougouag, Idaho Falls, ID (US); Ramazan Sonat Sen, Idaho Falls, ID (US); George W. Griffith, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 36 days.

(21) Appl. No.: 17/017,534

(22) Filed: Sep. 10, 2020

(65) Prior Publication Data

US 2022/0076854 A1  Mar. 10, 2022

(51) Int. Cl.
*G21C 15/12* (2006.01)
*G21C 15/18* (2006.01)
(Continued)

(52) U.S. Cl.
CPC ............. *G21C 15/12* (2013.01); *G21C 1/326* (2013.01); *G21C 9/00* (2013.01); *G21C 15/10* (2013.01);
(Continued)

(58) Field of Classification Search
CPC .. F28D 2021/0054; F28D 9/0025; F28D 7/06; F28D 7/1669; F28D 7/08;
(Continued)

(56) References Cited

U.S. PATENT DOCUMENTS

| 4,082,609 A | 4/1978 | Schweiger |
| 4,661,311 A | 4/1987 | Schoening et al. |

(Continued)

FOREIGN PATENT DOCUMENTS

| CN | 201134329 Y | 10/2008 |
| CN | 107632101 A | 1/2018 |

(Continued)

*Primary Examiner* — Darlene M Ritchie
(74) *Attorney, Agent, or Firm* — TraskBritt

(57) ABSTRACT

A system for transferring heat from a nuclear reactor comprises a nuclear reactor comprising a nuclear fuel and a reactor vessel surrounding the nuclear reactor and a heat transfer system surrounding the nuclear reactor. The heat transfer system comprises an inner wall surrounding the nuclear reactor vessel, first fins coupled to an outer surface of inner wall, an outer wall between the inner wall and a surrounding environment, and second fins coupled to an inner surface of the outer wall and extending in a volume between the outer surface of the inner wall and the inner surface of the outer wall, the outer surface of the inner wall and the first fins configured to transfer heat from the nuclear reactor core to the second fins and the inner surface of the outer wall by thermal radiation. The heat transfer system may be directly coupled to the nuclear reactor vessel, or may be coupled to an external reflector surrounding the nuclear reactor vessel. Related heat transfer systems and systems for selectively removing heat from a nuclear reactor are disclosed.

17 Claims, 8 Drawing Sheets

(51) Int. Cl.
  *G21C 15/10* (2006.01)
  *G21C 9/00* (2006.01)
  *G21C 1/32* (2006.01)
  *F28D 7/08* (2006.01)
  *F28D 21/00* (2006.01)
  *G21C 11/06* (2006.01)
  *G21C 1/07* (2006.01)

(52) U.S. Cl.
  CPC .............. *G21C 15/18* (2013.01); *F28D 7/082* (2013.01); *F28D 2021/0054* (2013.01); *G21C 1/07* (2013.01); *G21C 11/06* (2013.01)

(58) Field of Classification Search
  CPC .......... F28D 7/082; F28D 7/085; F28D 7/087; F28D 7/0016; G21C 15/02; G21C 15/18; G21C 15/10; G21C 1/326; G21C 1/32; G21C 9/00; G21D 3/04; Y02E 30/30; Y02E 30/10; Y02E 30/00; Y02E 10/44
  USPC ................ 376/298, 299, 367, 404, 405, 406
  See application file for complete search history.

(56) References Cited

U.S. PATENT DOCUMENTS

| | | | |
|---|---|---|---|
| 4,958,679 A | 9/1990 | Drosdziok et al. | |
| 5,017,333 A | 5/1991 | Hayashi et al. | |
| 5,190,720 A | 3/1993 | Hunsbedt et al. | |
| 6,269,873 B1 | 8/2001 | Gautier et al. | |
| 8,910,701 B2 | 12/2014 | Torres Sepulveda et al. | |
| 9,297,591 B1 | 3/2016 | Von Hack-Prestinary et al. | |
| 2004/0262167 A1* | 12/2004 | Burch | C01B 3/382 423/652 |
| 2009/0129531 A1* | 5/2009 | Reyes, Jr. | G21C 1/322 376/299 |
| 2011/0075786 A1* | 3/2011 | McWhirter | F28D 1/0213 376/405 |
| 2012/0230458 A1 | 9/2012 | Finken | |
| 2013/0177975 A1 | 7/2013 | Goetz et al. | |
| 2015/0198372 A1* | 7/2015 | Desikan | H01M 10/613 165/151 |
| 2015/0243390 A1* | 8/2015 | Bracey | G21F 5/14 376/272 |
| 2017/0278586 A1 | 9/2017 | Van Staden et al. | |
| 2018/0226159 A1 | 8/2018 | Sterbentz et al. | |
| 2020/0217518 A1* | 7/2020 | Field | F24D 11/003 |
| 2021/0125737 A1* | 4/2021 | Botha | G21C 5/18 |
| 2021/0210222 A1* | 7/2021 | Abbott | G21C 3/54 |
| 2021/0210229 A1* | 7/2021 | Gauthe | G21C 1/02 |
| 2021/0272708 A1* | 9/2021 | Cisneros, Jr. | G21C 15/12 |

FOREIGN PATENT DOCUMENTS

| | | |
|---|---|---|
| WO | 2018/175663 A2 | 9/2018 |
| WO | 2019/112991 A1 | 6/2019 |

* cited by examiner

HEAT TRANSFER SYSTEMS FOR NUCLEAR REACTOR CORES, AND RELATED SYSTEMS

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to heat transfer systems for nuclear reactors and to related methods of removing heat from a nuclear reactor core. More particularly, embodiments of the disclosure relate to heat removal devices (e.g., enhanced radiative heat removal devices, heat transfer valves, and transitioning heat insulation to heat transmission devices) that, depending on circumstances, impede then allow heat transfer to heat sinks and to ultimate heat sinks for removal of heat from a nuclear reactor core, and to related systems for selectively removing heat from a nuclear reactor core.

BACKGROUND

Generation of power by nuclear fuel includes the generation of heat, such as by fission of nuclear fuel materials within a nuclear reactor core and decay of fission and neutron activation products. Heat generated in the nuclear reactor core is removed from the nuclear reactor core by circulation of a heat transfer fluid (e.g., working fluid, also referred to as a coolant) to create a heated fluid that, in turn, is used to generate power. For example, the heat transfer fluid may comprise water (e.g., liquid water) that cools the reactor core to generate steam. The steam may pass through a turbine coupled to an electric generator to generate electricity. After passing through the turbine, the steam may at least partially condense and/or pass through a condenser to condense the steam to liquid water. The liquid water is reheated by the nuclear reactor core to repeat the cycle of heat removal from the nuclear reactor core to generate steam, and power generation from the steam.

During normal operation, the fission and decay heat that is generated within the nuclear reactor core is cooled by circulation of the heat transfer fluid. However, during emergency situations, such as instances when the circulation of the heat transfer fluid is insufficient to remove all of the heat generated by the nuclear reactor core, loss of circulation of the heat transfer fluid, or during or after shut down procedures, the decay heat of the nuclear reactor core must be removed from the nuclear reactor to prevent a meltdown or damage to components of the nuclear reactor (e.g., the nuclear fuel, the reactor core internal components, and the reactor vessel). Reactor shut down may be achieved by inserting control rods into the nuclear fuel to deprive the nuclear fuel of neutrons required for fission reactions. Even with the use of reactor poisons or the insertion of control rods to reduce or substantially prevent further fission reactions, decay of the fission products in the nuclear reactor core may continue to generate significant heat that must be dissipated from the nuclear reactor core to prevent damage to the nuclear reactor core. Accordingly, nuclear reactors for power generation require several safety systems in the event that an emergency shutdown becomes necessary and/or in circumstances when the heat generation of the nuclear reactor is out of balance with the heat removal from the nuclear reactor.

Auxiliary cooling systems, which may also be referred to as paths to an "ultimate heat sink," or more simply, by extension, as a "heat sink," are commonly utilized to safely remove heat from the nuclear reactor during shut down. Such auxiliary cooling systems reduce the temperature of the nuclear reactor with natural circulation of air or water. However, if the circulation of the air or water is hindered, the auxiliary cooling system may not sufficiently remove heat from the nuclear reactor.

BRIEF SUMMARY

Embodiments disclosed herein include heat transfer systems for selectively removing heat from a nuclear reactor, and related systems. For example, in accordance with one embodiment, a system for transferring heat from a nuclear reactor comprises a nuclear reactor comprising a nuclear fuel and a heat transfer system surrounding the nuclear reactor. The heat transfer system comprises an inner wall surrounding the nuclear reactor (i.e., nuclear reactor vessel with the nuclear reactor core therein), first fins coupled to an outer surface of the inner wall, an outer wall between the inner wall and a surrounding environment, and second fins coupled to an inner surface of the outer wall and extending in a volume between the outer surface of the inner wall and the inner surface of the outer wall, the outer surface of the inner wall and the first fins configured to transfer heat from the nuclear reactor to the second fins and the inner surface of the outer wall by thermal radiation.

Additional embodiments are directed to a heat transfer system for a nuclear reactor, comprising an inner wall disposed around at least a portion of a nuclear reactor, first fins coupled to an outer surface of the inner wall, an outer wall disposed around the inner wall, and second fins coupled to an inner surface of the outer wall and alternating with the first fins in a volume between the outer wall and the inner wall.

In accordance with additional embodiments of the disclosure, a system comprises a nuclear reactor, a heat exchanger in operable communication with the nuclear reactor and configured to circulate a fluid through the nuclear reactor to cool the nuclear reactor and generate electricity, and a heat transfer device disposed around at least a portion of the nuclear reactor. The heat transfer device comprises an inner wall surrounding at least a portion of the nuclear reactor, an outer wall disposed around the inner wall and defining a volume between the inner wall and the outer wall, first fins coupled to an outer surface of the inner wall and extending into the volume, and second fins coupled to an inner surface of the outer wall and extending into the volume, the second fins alternating with the first fins.

DETAILED DESCRIPTION

Figure 1A:
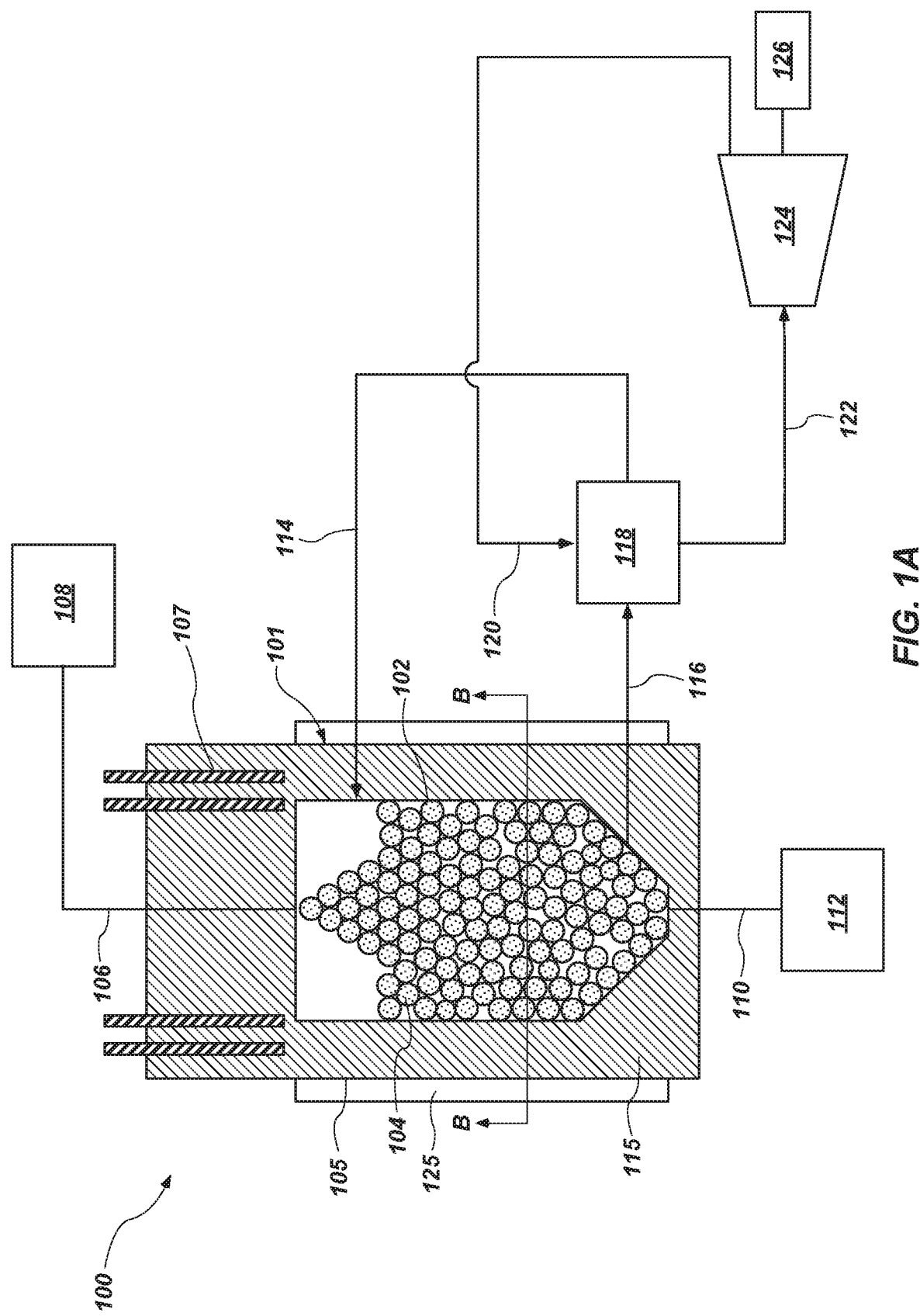
FIG. 1A is a simplified schematic illustrating a nuclear power plant system for generation of power, in accordance with embodiments of the disclosure.

Illustrations presented herein are not meant to be actual views of any particular material, component, or system, but are merely idealized representations that are employed to describe embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, system, or method for forming an enhanced heat transfer system (e.g., an enhanced path to an ultimate heat sink (UHS)) for a nuclear reactor, or for removing heat from a nuclear reactor. Only those process acts and structures necessary to understand the embodiments of the disclosure are described in detail below. Additional acts to form a heat transfer system to remove heat from a nuclear reactor may be performed by conventional techniques. Further, any drawings accompanying the present application are for illustrative purposes only and, thus, are not drawn to scale. Additionally, elements common between figures may retain the same numerical designation.

According to embodiments described herein, a heat transfer system for selectively removing heat from a nuclear reactor utilizes a passive heat transfer mechanism for removing heat from the nuclear reactor when other heat removal paths and heat removal mechanisms are no longer sufficient to cool the nuclear reactor (e.g., when the rate of heat generation of the nuclear reactor is greater than the rate of heat removal from the nuclear reactor by normal convection to the energy conversion system), during reactor shut down status during which normal heat removal systems are not operating, or during equipment failure (e.g., loss of coolant or loss of coolant circulation). The heat transfer system may be sized, shaped, and configured to exhibit thermally insulative properties during normal operation of the nuclear reactor and to exhibit thermally conductive properties at temperatures exceeding normal operating temperatures of the nuclear reactor. As such, the heat transfer system may be referred to herein as a "heat transfer valve." The heat transfer system may include an inner wall around at least a portion of the nuclear reactor at the level of the nuclear reactor core, and an outer wall surrounding the inner wall. In some embodiments, a volume between the inner wall and the outer wall may include fins that facilitate radiative heat transfer from the inner wall to the outer wall. The outer wall may be in contact with an external environment to conductively transfer heat from the outer wall to the external environment (an external heat sink, such as one or more of the ground of the Earth, the atmosphere, and a body of water), may be configured to convectively transfer heat therefrom to the external environment, or both. In some embodiments, heat is transferred from the nuclear reactor to the inner wall via convective and/or conductive heat transfer and from the inner wall to the outer wall by (e.g., substantially completely by, completely by) thermal radiation. In some embodiments, heat may not be substantially transferred from the inner wall to the outer wall by other means, such as by convective heat transfer or conductive heat transfer. The heat transfer system may be structured to facilitate removal of heat from the nuclear reactor at temperatures greater than a predetermined temperature based on the desired operating parameters of the nuclear reactor core, while not substantially removing heat from the nuclear reactor during normal use and operation. Accordingly, the heat transfer system may not undesirably remove heat from the nuclear reactor and reduce the efficiency thereof during normal use and operation. The heat transfer system does not include moving parts or moving fluids (e.g., moving liquids) and may, therefore, not be prone to failure, as conventional heat transfer systems that require the circulation of air, water, or other fluids (and the associated blowers, pumps, etc.) for active cooling, such as convective cooling. The heat transfer system may be sized, shaped, and configured to facilitate sufficient removal of heat from the nuclear reactor core during emergency situations and may facilitate increasing the safe power generation capacity (e.g., the power density) of the nuclear reactor core.

FIG. 1A is a simplified schematic illustrating a nuclear power plant system 100 for generation of power, in accordance with embodiments of the disclosure. The nuclear power plant system 100 includes a nuclear reactor 101 including a nuclear reactor core (which may also be referred to herein simply as a "reactor core") 102 configured to generate heat for the production of electricity. The reactor core 102 may comprise, for example, a pebble bed core. In some such embodiments, the reactor core 102 includes fuel pebbles 104 of a nuclear fuel formulated to undergo fission reactions to generate heat.

The reactor core 102 may be surrounded by a vessel 105, which may contain, for example, the components of the reactor core 102 (e.g., the fuel pebbles 104, a neutron reflector, a heat shield, etc.). The vessel 105 (which may also be referred to herein as a "reactor vessel") may comprise, for example, a metal (e.g., steel, stainless steel, etc.). In some embodiments, the vessel 105 comprises steel. As will be described herein with reference to FIG. 1H, in some embodiments, the vessel 105 is encased in an outer reflector that is thermally conductive.

In some embodiments, a fuel pebble feed 106 is in operable communication with the reactor core 102 and may provide fresh fuel pebbles 104 to the reactor core 102 from a fuel pebble storage tank 108. During use and operation of the reactor core 102, the fuel pebbles 104 are transferred from an upper portion of the reactor core 102 downward toward an outlet 110 where fuel pebbles 104 that have been transported through the reactor core 102 exit the reactor core 102 and enter a storage tank 112. In some embodiments, the fuel pebbles 104 may be transferred through the reactor core 102 more than once before they are spent. In other words, in some such embodiments, the fuel pebbles 104 from the storage tank 112 may be recirculated to the fuel pebble storage tank 108.

In some embodiments, the fuel pebbles 104 comprise tri-structural-isotropic (TRISO) fuel particles. In some such embodiments, the fuel pebbles 104 may comprise, for example, a core comprising a nuclear fuel (e.g., TRISO particles embedded in a carbon matrix) and an outer carbon layer. In some such embodiments, the TRISO particles may comprise a core containing one or more of UCO, $UO_2$, $ThO_2$, a combination of UCO, $UO_2$ and $ThO_2$, a transuranic carbide material, a buffer layer around the core, an inner carbon layer around the buffer layer, a ceramic layer around the inner carbon layer, and an outer carbon layer around the ceramic layer. The buffer layer may be formulated and configured to accommodate expansion of the core and of released fission gases from the core. The inner carbon layer and the outer carbon layer may attenuate migration of radionuclides and may comprise, for example, pyrolytic carbon. The ceramic layer may comprise one or more of a silicon carbide material, a zirconium carbide material, or another material.

A reactor reflector 115 (also referred to as a "neutron reflector") may be disposed around the reactor core 102 and located between the reactor core 102 and the vessel 105. The reactor reflector 115 may include one or more of graphite, beryllium, beryllium oxide, and depleted uranium.

One or more control rods 107 formulated and configured to control a fission rate of the nuclear fuel pebbles 104 may be located within the reactor reflector 115. The control rods 107 may include one or more materials formulated and configured to absorb neutrons. By way of non-limiting example, the control rods 107 may include one or more of boron, cadmium, silver, lithium, and indium. In some embodiments, the control rods 107 comprise boron.

Although not illustrated in FIG. 1A, in some embodiments, at least a portion of the nuclear reactor core 102 is surrounded by a thermal insulation material. In some such embodiments, the thermal insulation material may be located between the nuclear reactor core 102 and the vessel 105.

With continued references to FIG. 1A, a coolant fluid 114 may flow through the bed of fuel pebbles 104 of the reactor core 102 to form a heated coolant fluid 116. In some embodiments, the heated coolant fluid 116 exiting the reactor core 102 has a temperature greater than about 600° C., such as greater than about 700° C., greater than about 800° C., or greater than about 900° C.

The coolant fluid 114 may include a material that is inert with respect to the composition of the fuel pebbles 104. In some embodiments, the coolant fluid 114 is substantially free of oxygen. In some embodiments, the coolant fluid 114 comprises helium.

The heated coolant fluid 116 may exit the reactor core 102 and enter a heat exchanger 118 where heat from the heated coolant fluid 116 is transferred to a working fluid 120 to cool the heated coolant fluid 116 to the temperature of the coolant fluid 114. The cooled coolant fluid 114 is recirculated to the reactor core 102 to flow through the bed of fuel pebbles 104 to generate the heated coolant fluid 116 and the cycle is repeated.

The working fluid 120 may be heated by the heated coolant fluid 116 in the heat exchanger 118 to form a heated working fluid 122. In some embodiments, the working fluid 120 comprises water (e.g., liquid water) and the heated working fluid 122 may comprise steam. In some such embodiments, the working fluid 120 undergoes a phase change within the heat exchanger 118. The heated working fluid 122 may pass through a turbine 124 that is, in turn, coupled to an electric generator 126 for generating electricity.

In some embodiments, the heated working fluid 122 is condensed after the turbine 124 to form the working fluid 120. In some embodiments, the working fluid 120 is circulated back to the heat exchanger 118 to be heated by the heated coolant fluid 116. As will be understood, in some embodiments, the working fluid 120 may be condensed to form a liquid working fluid 120 that is circulated to the heat exchanger 118.

During normal operation (e.g., steady state operation) of the nuclear reactor core 102 and the balance of the nuclear power plant system 100, the heat removed from the nuclear reactor 101 by the coolant fluid 114 may be substantially equal to the heat generated within the nuclear reactor core 102 by the fuel pebbles 104. However, in situations where the nuclear reactor 101 generates more heat than is removed by the coolant fluid 114, the nuclear power plant system 100 may include a heat transfer system for preventing damage to the fuel pebbles 104 and the nuclear reactor 101 that would otherwise be caused by being exposed to excessive temperatures.

Figure 1B:
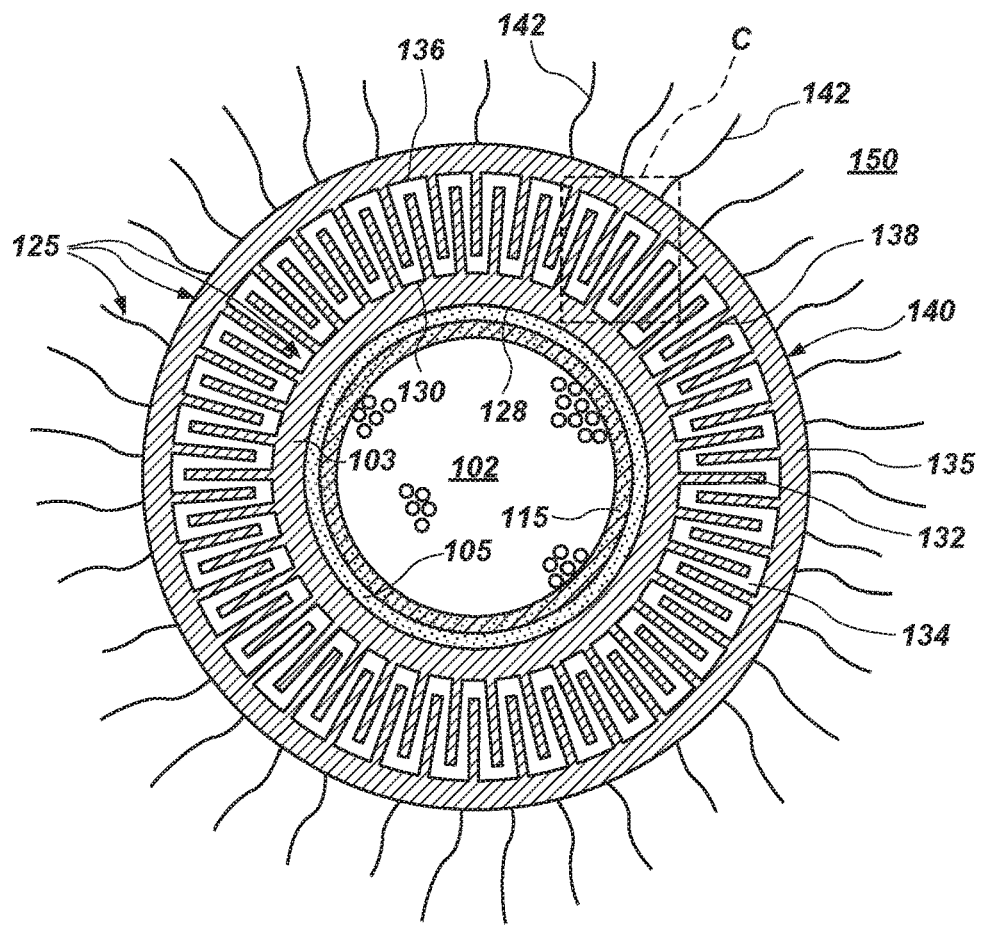
FIG. 1B is a simplified cross-sectional view of a nuclear reactor and a heat transfer system disposed around the nuclear reactor taken through section line B-B of FIG. 1A, in accordance with embodiments of the disclosure.

With continued reference to FIG. 1A, a heat transfer system 125 may be disposed around the vessel 105. For simplicity of illustration, details of the heat transfer system 125 are not illustrated in FIG. 1A and are illustrated in FIG. 1B, which is a simplified cross-sectional view of the nuclear reactor 101 and the heat transfer system 125 surrounding the vessel 105 taken through section line B-B of FIG. 1A, in accordance with embodiments of the disclosure. In order to show details, the scale and proportions of the elements represented in FIG. 1B are not the same as in FIG. 1A. The heat transfer system 125 may be located between the vessel 105 surrounding the nuclear reactor core 102 and a surrounding environment 150. The heat transfer system 125 may comprise an inner wall 103 in contact with an outer surface of the vessel 105 of the nuclear reactor core 102. The inner wall 103 may include an inner surface 128 and an outer surface 130 opposite the inner surface 128.

The heat transfer system 125 may further include an outer wall 135 defined by an inner surface 136 and an outer surface 140 (shown as an arrow to distinguish from heat transfer structures 142). A space between the inner surface 136 of the outer wall 135 and the outer surface 130 of the inner wall 103 may define a volume 134. In some embodiments, the volume 134 is filled with air (e.g., a composition including about 78 atomic percent nitrogen, about 21 atomic percent oxygen, and about 1 atomic percent argon). In other embodiments, the volume 134 may include one or more materials (e.g., gases) having a thermal conductivity less than a thermal conductivity of air, such as one or more of argon or carbon dioxide. In yet other embodiments, the volume 134 is under vacuum or a partial vacuum.

In some embodiments, at least a portion of the outer wall 135 may be in contact with the surrounding environment 150. The surrounding environment 150 may comprise an ultimate heat sink for the nuclear reactor 101 (FIG. 1A) such as, for example, the Earth (e.g., the ground), the atmosphere (e.g., the air above the ground and in the sky), water, or another heat sink. In some embodiments, at least a portion of the outer wall 135 is buried below a surface of the Earth. In yet other embodiments, at least a portion of the outer wall 135 is exposed to air, such as ambient air. In yet other embodiments, at least a portion of the outer wall 135 is surrounded by an ultimate heat sink comprising water. In yet other embodiments, at least a portion of the outer wall 135 is in contact with an ultimate heat sink via the heat transfer structures 142.

As will be described herein, heat may be transferred from the nuclear reactor 101 (FIG. 1A) through the vessel 105 of the nuclear reactor 101 to the inner surface 128 of the inner wall 103. Heat may be transferred from inner surface 128 to the outer surface 130 by conduction and from the outer surface 130 of the inner wall 103 to the inner surface 136 of the outer wall 135 by radiative heat transfer. For example, heat may be transferred from the nuclear reactor core 102 to the vessel 105 by, for example, one or more of (e.g., all of) conductive heat transfer, convective heat transfer, and radiative heat transfer. Heat may be transferred from the vessel 105 (e.g., via a surface interfacing with the inner surface 128 of the inner wall 103 of the heat transfer device 125) to the outer wall 135, such as by, for example, radiative heat transfer. In some embodiments, heat transfer from the inner wall 103 to the outer wall 135 may be by (e.g., substantially by, primarily by, entirely by) radiative heat transfer.

Each of the inner wall 103 and the outer wall 135 may independently comprise one or more of steel (e.g., stainless steel, such as austenitic stainless steel (e.g., 304 stainless steel, 316 stainless steel), ferritic stainless steel (e.g., 409 stainless steel, 430 stainless steel), martensitic stainless steel (e.g., 420 stainless steel), duplex stainless steel, precipitation hardened stainless steel (e.g., martensitic 17-4 PH stainless steel)), iron, copper, aluminum, aluminum oxide ($Al_2O_3$), alloys of aluminum (e.g., aluminum alloyed with one or more of copper, magnesium, manganese, silicon, tin, and zinc, such as one or more of 1000 series aluminum (alloys with a minimum of 99 weight percent aluminum), 2000 series aluminum (alloys of aluminum and copper), 3000 series aluminum (alloys of aluminum and manganese), 4000 series aluminum (alloys of aluminum and silicon, also referred to as "silumin"), 5000 series aluminum (alloys of aluminum and magnesium), 6000 series aluminum (alloys of aluminum, magnesium, and silicon), 7000 series aluminum (alloys of aluminum and zinc), or 8000 series aluminum), silver, alloys of nickel (e.g., alloys of nickel and chromium (e.g., alloys including nickel, chromium, and one or more of molybdenum, tungsten, and cobalt, such as Inconel® 617, Inconel® 718, alloy 600, alloy X-750), alloys of nickel and manganese), a refractory metal alloy (e.g., alloys of one or more of one or more of molybdenum, niobium, rhenium, tantalum, tungsten, chromium, hafnium, iridium, osmium, ruthenium, titanium, vanadium, and zirconium), cermet materials (composites of a ceramic material (e.g., one or more of tungsten carbide, tungsten nitride, titanium carbide, titanium nitride, silicon carbide, silicon nitride, tantalum carbide, tantalum nitride, niobium carbide, boron carbide) and a metal (e.g., a binder such as one or more of nickel, cobalt, iron, copper, molybdenum), such as one or more of tungsten carbide with one or more of cobalt, nickel, iron, or copper (e.g., WC—Co—Ni), titanium carbide with one or more of cobalt, nickel, iron, or copper (e.g., TiC—Co—Ni), silicon carbide with one or more of cobalt, nickel, iron, copper, or molybdenum), or a carbon-containing material (e.g., a carbon-carbon composite material, such as a carbon fiber reinforced carbon matrix composite material).

In some embodiments, the inner wall 103 comprises steel, such as a stainless steel alloy. In other embodiments, the inner wall 103 comprises aluminum, such as one or more of elemental aluminum, aluminum oxide, or an aluminum alloy. In yet other embodiments, the wall 103 comprises silver. In further embodiments, the inner wall 103 comprises an alloy of nickel, a refractory metal alloy, or a cermet material. In additional embodiments, the inner wall 103 comprises a carbon-carbon composite material.

In some embodiments, the outer surface 130 of the inner wall 103 may include a coating formulated and configured to facilitate a desired amount of heat transfer from the outer surface 130 of the inner wall 103 to the inner surface 136 of the outer wall 135. By way of non-limiting example, the coating may comprise one or more of paint (e.g., a reflective paint, such as a white paint or a silver paint, an absorptive paint, such as a black paint), an oxide (such as aluminum oxide, titanium oxide, tungsten oxide, nickel oxide, chromium oxide), an epoxy material (e.g., a phenolic epoxy), and a plasma coating (e.g., one or more of chromium carbide, chromium oxide, tungsten carbide-cobalt, aluminum oxide, silicon dioxide, zirconium oxide, boron carbide, molybdenum, nickel, cobalt). In some embodiments, the outer surface 130 may be exposed to ion implantation to create a surface that will radiate and absorb thermal radiation. In some such embodiments, the outer surface 130 may be implanted with one or more of nickel, cobalt, iron, copper, silver, molybdenum, aluminum. In some embodiments, the coating imparts hydrophilic properties to the outer surface 130. In other embodiments, the coating imparts hydrophobic properties to the outer surface 130. In some embodiments, the inner surface 136 of the outer wall 135 comprises one or more of the coating materials described above with reference to the coating of the inner wall 103. In some embodiments, the coating of the outer wall 135 is formulated and configured to facilitate increased absorption of radiative energy emitted from the outer surface 130 of the inner wall 103.

The coating on the outer surface 130 may have a thickness within a range from about 0.1 mm to about 5.0 mm, such as from about 0.1 mm to about 0.2 mm, from about 0.2 mm to about 0.4 mm, from about 0.4 mm to about 0.6 mm, from about 0.6 mm to about 0.8 mm, from about 0.8 mm to about 1.0 mm, from about 1.0 mm to about 2.0 mm, from about 2.0 mm to about 3.0 mm, or from about 3.0 mm to about 5.0 mm.

In some embodiments, the outer surface 130 of the inner wall 103 may be modified to induce a desired surface roughness of the outer surface 130. By way of non-limiting example, a surface roughness (e.g., an arithmetic mean roughness value ($R_a$)) of the outer surface 130 may be within a range from about 0.025 μm $R_a$ to about 50.0 μm $R_a$, such as from about 0.025 μm $R_a$ to about 0.05 μm $R_a$, from about 0.05 μm $R_a$ to about 0.10 μm $R_a$, from about 0.10 μm $R_a$ to about 0.25 μm $R_a$, from about 0.25 μm $R_a$ to about 0.50 μm $R_a$, from about 0.50 μm $R_a$ to about 1.0 μm $R_a$, from about 1.0 μm $R_a$ to about 2.0 μm $R_a$, from about 2.0 μm $R_a$ to about 4.0 μm $R_a$, from about 4.0 μm $R_a$ to about 6.0 μm $R_a$, from about 6.0 μm $R_a$ to about 8.0 μm $R_a$, from about 8.0 μm $R_a$ to about 10.0 μm $R_a$, from about 10.0 μm $R_a$ to about 20.0 μm $R_a$, from about 20.0 μm $R_a$ to about 30.0 μm $R_a$, or from about 30.0 μm $R_a$ to about 50.0 μm $R_a$. In some embodiments, the surface roughness is from about 0.025 μm $R_a$ to about 1.0 μm $R_a$. In other embodiments, the surface roughness is from about 1.0 μm $R_a$ to about 50.0 μm $R_a$. The surface roughness of the outer surface 130 may be selected such that the outer surface 130 exhibits a desired amount of reflectivity and emissivity. The outer surface 130 may include a surface that has been exposed to grinding, turning, polishing, or sand/grit blasting to impart the desired surface roughness. In addition, in some embodiments, the inner surface 136 of the outer wall 135 may similarly be modified to induce a desired surface roughness thereof, such as a surface roughness within a range from about 0.025 μm $R_a$ to about 50.0 μm $R_a$, by way of non-limiting example, as described above with reference to the outer surface 130.

In some embodiments, one or more fins 132 may be coupled to (extend from) the outer surface 130 of the inner wall 103. In some embodiments, the one or more fins 132 extend from the outer surface 130 into the volume 134 between the outer surface 130 of the inner wall 103 and the inner surface 136 of the outer wall 135. In some embodiments, a gap remains between the fins 132 and the inner surface 136 of the outer wall 135. In other words, in some such embodiments, the fins 132 may not extend from the outer surface 130 of the inner wall 103 all the way to the inner surface 136 of the outer wall 135 and the fins 132 may not contact the inner surface 136.

The fins 132 may be interspersed with fins 138 extending from the inner surface 136 of the outer wall 135 into the volume 134. In other words, in some embodiments, the fins 132 may be interdigitated with the fins 138. Stated another way, a fin 138 extending from the inner surface 136 may be located between adjacent fins 132 of the inner wall 103. Similarly, a fin 132 extending from the outer surface 130 may be located between adjacent fins 138 of the outer wall 135. In some embodiments, within the volume 134 and along a circumference of the outer surface 130 of the inner wall 103 and the inner surface 136 of the outer wall 135, the respective fins 132, 138 may be spaced such that every other fin 132, 138 is one of the fins 132 and the other of the every other fins 132, 138 is one of the fins 138. Stated in yet another way, within the volume 134, the fins 132 may alternate with the fins 138 and each of the fins 132 may not be directly adjacent one another; rather each of the fins 132 may be spaced from a neighboring one of the fins 132 by one of the fins 138. Similarly, the fins 138 may not be directly adjacent one another and may be spaced from a neighboring one of the fins 138 by one of the fins 132.

In some embodiments, an angular spacing between neighboring fins 132 along a circumference of the outer surface 130 of the inner wall 103 may be within a range from about 0.5° to about 180°, such as from about 0.5° to about 1°, from about 1° to about 2°, from about 2° to about 3°, from about 3° to about 4°, from about 4° to about 5°, from about 5° to about 10°, from about 10° to about 15°, from about 15° to about 20°, from about 20° to about 25°, from about 25° to about 30°, from about 30° to about 45°, from about 45° to about 60°, from about 60° to about 90°, or from about 90° to about 180°. Accordingly, an angle between each fin 132 may be from about 0.5° to about 180°. In some embodiments, an angle between each fin 132 is from about 0.5° to about 30°. In some embodiments, the fins 132 are substantially equally spaced from one another.

Each fin 138 of the fins 138 may be spaced from each other along a circumference of the inner surface 136 of the outer wall 135 within a range from about 0.5° to about 180°, such as from about 0.5° to about 1°, from about 1° to about 2°, from about 2° to about 3°, from about 3° to about 4°, from about 4° to about 5°, from about 5° to about 10°, from about 10° to about 15°, from about 15° to about 20°, from about 20° to about 25°, from about 25° to about 30°, from about 30° to about 45°, from about 45° to about 60°, from about 60° to about 90°, or from about 90° to about 180°. In some embodiments, an angle between each fin 138 is from about 0.5° to about 30°. In some embodiments, the fins 138 are substantially equally spaced from one another.

The fins 132 may be directly coupled to the outer surface 130 of the inner wall 103 by one or more of welding, press fitting, glue, soldering, liquid bonding, or shrink fitting. In other embodiments, the fins 132 are cast with the inner wall 103. Similarly, the fins 138 may be directly coupled to the inner surface 136 of the outer wall 135 by one or more of welding, press fitting, glue, soldering, liquid bonding, or shrink fitting. In other embodiments, the fins 138 are cast with the outer wall 135.

The fins 132 may be configured to facilitate selective removal of heat (e.g., decay heat) from the inner wall 103 to the outer wall 135, which is, in turn, transferred to the surrounding environment 150. The fins 132 may be formed of and include one or more of the materials described above with reference to the inner wall 103. The fins 132 may comprise one or more of steel, iron, copper, aluminum, aluminum oxide ($Al_2O_3$), alloys of aluminum, alloys of nickel and manganese, a refractory metal alloy, cermet materials, or a carbon-containing material. In some embodiments, the fins 132 comprise steel, such as a stainless steel alloy. In other embodiments, the fins 132 comprise aluminum, such as one or more of elemental aluminum, aluminum oxide, or an aluminum alloy. In yet other embodiments, the fins 132 comprise silver. In further embodiments, the fins 132 comprise an alloy of nickel, a refractory metal alloy, or a cermet material. In additional embodiments, the fins 132 comprises a carbon-carbon composite material. In some embodiments, the fins 132 comprise the same material composition as the outer surface 130 of the inner wall 103. In other embodiments, the fins 132 comprise a different material composition than the outer surface 130.

The fins 138 may comprise one or more of the materials described above with reference to the fins 132. In some embodiments, the fins 138 comprise the same material composition as the fins 132. In other embodiments, the fins 138 comprise a different material composition than the fins 132.

Figure 1C:
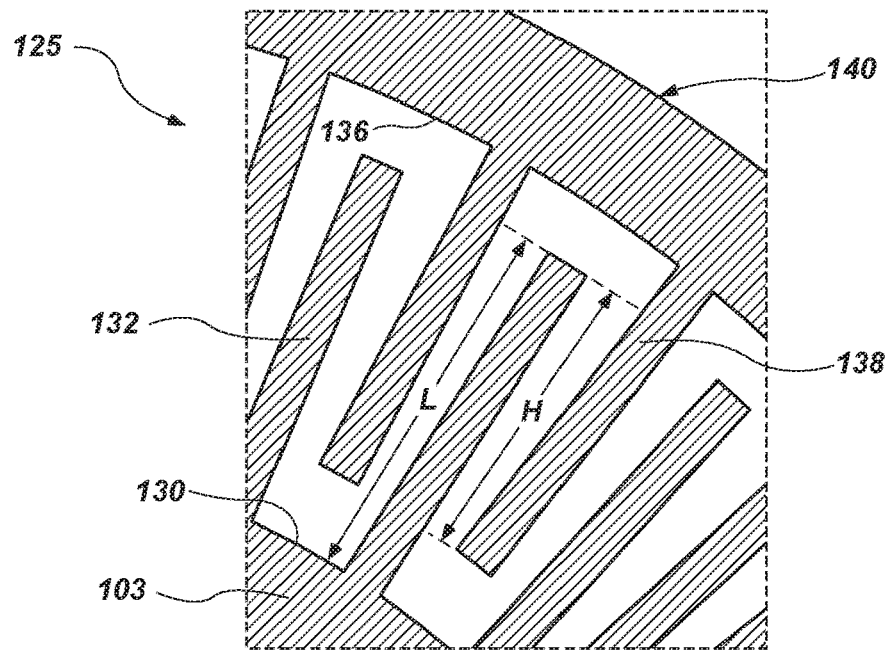
FIG. 1C is an expanded view of a portion of the heat transfer system of FIG. 1B illustrating box C of FIG. 1B, in accordance with embodiments of the disclosure.

FIG. 1C is an expanded view of a portion of the heat transfer system 125 illustrating box C of FIG. 1B. With reference to FIG. 1C, an amount of overlap H between the fins 132 extending from the outer surface 130 of the inner wall 103 and the fins 138 extending from the inner surface 136 of the outer wall 135 may be within a range from about 0.1 percent of a length L of the fin 132 to about 99 percent a length L of the fin 132, such as from about 0.1 percent to about 10 percent, from about 10 percent to about 20 percent, from about 20 percent to about 30 percent, from about 30 percent to about 50 percent, from about 50 percent to about 70 percent, from about 70 percent to about 80 percent, from about 80 percent to about 90 percent of the length L of the fin 132, or from about 90 percent to about 99 percent. In some embodiments, the overlap H is selected such that thermal expansion of the components of the heat transfer system 125 results in direct physical thermal contact of the fins 132 with the inner surface 136 of the outer wall 135 when a temperature of the inner wall 103 exceeds a predetermined threshold. In other embodiments, the overlap H is selected such that direct physical contact of the fins 132 with the inner surface 136 of the outer wall 135 is precluded.

In some embodiments, the length L of the fins 132 may be substantially equal to the length of the fins 138. In other embodiments, the length L of the fins 132 is different from the length of the fins 138. In some embodiments, the length L of the fins 132 is substantially uniform. In other embodiments one or more of the fins 132 has a length L different than the length L of at least another of the fins 132. In some embodiments, the length of the fins 138 is substantially uniform. In other embodiments, one or more of the fins 138 has a length different than the length of at least another of the fins 138.

In yet other embodiments, the length L of the fins 132 may be different from a length of the fins 138. For example, each of the fins 132 may have a greater length L than each of the fins 138. In yet other embodiments, each of the fins 138 may have a greater length than each of the fins 132.

In some embodiments, the overlap H may affect a view factor $F_{130\rightarrow 136}$ from the outer surface 130 and the fins 132 to the inner surface 136 and the fins 138 (which may also be represented as $F_{130+132\rightarrow 136+138}$). The view factor $F_{130\rightarrow 136}$ may be defined as a proportion of radiation that leaves the outer surface 130 of the inner wall 103 and the surfaces of the fins 132 that strikes the surfaces of the fins 138 and the inner surface 136 of the outer wall 135. In some embodiments, the view factor $F_{130\rightarrow 136}$ may be within a range from about 0.10 to about 0.99, such as from about 0.10 to about 0.20, from about 0.20 to about 0.30, from about 0.30 to about 0.40, from about 0.40 to about 0.50, from about 0.50 to about 0.60, from about 0.60 to about 0.70, from about 0.70 to about 0.80, from about 0.80 to about 0.90, or from about 0.90 to about 0.99. In some embodiments, the length L, the spacing between the fins 132 and the fins 138, the number of the fins 132, 138, and the overlap of the fins 132, 138 may be selected to impart a desired view factor $F_{130\rightarrow 136}$. In some embodiments, the length L, the spacing between the fins 132 and the fins 138, the number of the fins 132, 138, and the overlap H of the fins 132, 138 may be selected to impose that no physical contact between the inner wall 103 and associated fins 132 and outer wall 135 and associated fins 138 may occur at operating temperatures taking thermal expansion phenomena into account. In some embodiments, the overlap H is selected such that thermal expansion of the components of the heat transfer system 125 results in the fins 132 becoming in physical thermal contact with the inner surface 136 of the outer wall 135 when a temperature of the inner wall 103 exceeds a pre-determined threshold.

The fins 132 may increase the surface area from which radiative heat from the outer surface 130 of the inner wall 103 is emitted. Accordingly, the fins 132 increase the surface area through which radiative heat transfer occurs. In addition, the fins 138 may increase the surface area of the inner surface 138 of the outer wall 135 and the surface area by which radiative heat transfer from the inner wall 103 is received.

Figure 1D:
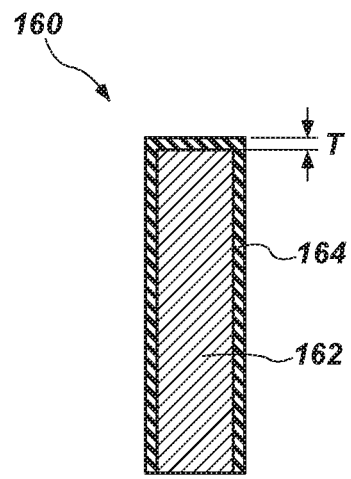
FIG. 1D is a simplified cross-sectional view of a fin, in accordance with embodiments of the disclosure.

FIG. 1D is a simplified cross-sectional view of a fin 160, which may correspond to one or both of the fins 132, 138. The fin 160 may include a core 162 comprising one or more of the materials described above with reference to the composition of the fins 132, 138, such as one or more of steel, iron, copper, aluminum, aluminum oxide ($Al_2O_3$), alloys of aluminum, alloys of nickel and manganese, a refractory metal alloy, cermet materials, or a carbon-containing material. The fin 160 may further optionally comprise a coating material 164 around a perimeter of the core 162.

The coating material 164 may be formulated and configured to impart desired thermal transfer properties (e.g., radiative thermal transfer properties) to the fin 160. In some embodiments, the coating material 164 may be selected to impart one or more of a desired emissivity, reflectivity, or absorptivity to the fin 160.

The coating material 164 may comprise an exposed surface exhibiting desired emissivity properties. The coating material 164 may comprise one or more of the materials described above with reference to the coating of the outer surface 130. By way of non-limiting example, the coating material 164 may comprise paint, silvered polytetrafluoroethylene (e.g., polytetrafluoroethylene coated with silver), an oxide material, an epoxy material, a plasma coating, or an ion implanted region. The coating material 164 may be hydrophilic or hydrophobic. In some embodiments, the exposed surfaces of the coating material 164 are black.

The coating material 164 may exhibit a desired surface roughness to impart a desired reflectivity of the exposed surfaces of the coating material 164. In some embodiments, the exposed surfaces are relatively smooth to facilitate an increased reflectivity of the coating materials 164. In other embodiments, the exposed surfaces of the coating material 164 are relatively rough to facilitate a relatively increased absorption of thermal radiation. The surface roughness of the coating material 164 may be the same as the surface roughness of the outer surface 130 described above. In some embodiments, the surface roughness of the fins 132, 138 is substantially the same as the surface roughness of the outer surface 130. In other embodiments, the surface roughness of the fins 132, 138 is greater (i.e., the fins 132, 138 are more rough) than the surface roughness of the outer surface 130. In yet other embodiments, the surface roughness of the fins 132, 138 is less (i.e., the fins 132, 138 are more smooth) than the surface roughness of the outer surface 130.

In some embodiments, the surface roughness $R_a$ of the fins 132 is different from the surface roughness $R_a$ of the fins 138. In some embodiments, the fins 132 have a lower surface roughness $R_a$ (are smoother) than the fins 138. In some such embodiments, the fins 132 may be more reflective than the fins 138. In other embodiments, the fins 132 have a greater surface roughness $R_a$ (are rougher and less smooth) than the fins 138.

In some embodiments, the surface roughness $R_a$ may be selected to be less than a wavelength of incident radiation during use and operation of the reactor core 102. In other embodiments, the surface roughness $R_a$ may be selected to be greater than a wavelength of incident radiation during use and operation of the reactor core 102. In some embodiments, the surface roughness is from about 0.025 μm $R_a$ to about 1.0 μm $R_a$. In other embodiments, the surface roughness is from about 1.0 μm $R_a$ to about 50.0 μm $R_a$.

The coating material 164 may have a thickness T within a range from about, for example, one monolayer to about 5.0 mm, such as from about one monolayer to about 0.5 nm to about 1.0 nm, from about 1.0 nm to about 10 nm, from about 10 nm to about 100 nm, from about 100 nm to about 500 nm, from about 500 nm to about 1.0 μm, from about 1.0 μm to about 10 μm, from about 10 μm to about 100 μm, from about 100 μm to about 500 μm, from about 500 μm to about 1.0 mm, from about 1.0 mm to about 2.0 mm, from about 2.0 mm to about 3.0 mm, or from about 3.0 mm to about 5.0 mm. However, the disclosure is not so limited and the thickness T of the coating material 164 may be different than those described.

Referring back to FIG. 1B, the outer surface 140 of the outer wall 135 may be in contact with the environment 150. The outer surface 140 may include heat transfer structures 142 coupled thereto and extending into the environment 150. The heat transfer structures 142 may comprise any material suitable for removing heat from the outer surface 140 to the environment 150 by one or more of conductive heat transfer, convective heat transfer, or radiative heat transfer. By way of non-limiting example, the heat transfer structures 142 may comprise fins, ribbons, plates, cables, thermal radiators, a mesh, an antenna, or another material structure.

In some embodiments, the heat transfer structures 142 are in direct contact with the environment 150, such as the Earth (e.g., soil). In other embodiments, the heat transfer structures 142 extend into a heat sink comprising water. The heat transfer structures 142 may transfer heat from the outer wall 135 to the environment 150 by conductive heat transfer. In some embodiments, at least some of the heat transfer structures 142 extend into the atmosphere and are formulated and configured to remove heat from the outer 135 by convective heat transfer (e.g., such as with wind passing adjacent to heat transfer structures 142).

The nuclear reactor 101 and the heat transfer system 125 may be structured and arranged such that during normal use and operation of the nuclear reactor 101, heat is not substantially removed from the nuclear reactor 101 (e.g., from the vessel 105) to the environment 150, such as from the vessel 105 to the outer surface 130 of the inner wall 103, from the outer surface 130 of the inner wall 103 to the outer wall 135, and from the outer wall 135 to the environment 150. Rather, during normal use and operation, heat is removed from the nuclear reactor 101 by the circulation of the coolant fluid 114 and the heated coolant fluid 116 (FIG. 1A), that in turn gives off its heat to the working fluid 120 to form the heated working fluid 122 that is, in turn, used to operate the turbine 124 that spins the electric generator 126 which generates electricity. However, during emergency or shut down situations, such as when the nuclear reactor 101 is out of thermal balance (e.g., during periods when circulation of the working fluid 120 has ceased or when the coolant fluid 114, 116 is removing less heat than is generated by the fuel 104 of the reactor core 102 or when the temperature of the nuclear reactor 101 (e.g., the vessel 105) exceeds a predetermined temperature), the nuclear reactor 101 and the heat transfer system 125 may be structured and arranged to facilitate removal of heat from the nuclear reactor 101 to the outer wall 135 and to the environment 150. Since the primary mode of heat transfer from the nuclear reactor 101 to the outer wall 135 is through radiative heat transfer (e.g., radiative heat transfer from the inner wall 103 to the outer wall 135), the rate of heat transfer may increase by the fourth power with increasing temperature, according to the Stephan-Boltzmann Law (i.e., $q = \sigma T^4 \cdot A$, wherein q is the rate of heat transfer per unit time (W), $\sigma$ is the Stephan-Boltzmann Constant, T is the absolute temperature in Kelvin (K) of the outer surface 130 and the fins 132, and A is the area of the emitting body (m$^2$) (e.g., the area of the outer surface 130 and the fins 132)). Accordingly, the outer surface 130 including the fins 132 may be structured and configured to remove heat from the nuclear reactor 101, the rate of which removal increases to the fourth power of the temperature of the outer surface 130 and the fins 132. Accordingly, with increasing temperature of the nuclear reactor 101, the temperature of the outer surface 130 and the fins 132 may exhibit a corresponding increase in temperature and the rate of heat removal from the nuclear reactor 101 may change at nearly the fourth power of the temperature of the outer surface 130 and the fins 132, which may approximate the temperature of the nuclear reactor 101 (depending on a temperature drop between the vessel 105 and the inner wall 103). In some such embodiments, the outer surface 130 and the fins 132 may be sized and shaped such that negligible heat is removed from the nuclear reactor 101 by thermal radiation at temperatures of the nuclear reactor 101 during normal use and operation of the reactor core 102 while sufficient heat is removed from the nuclear reactor 101 during emergency situations where the temperature of the nuclear reactor 101 is increased beyond conventional operating temperatures of the nuclear reactor 101. In some embodiments, the heat transfer system 125 may be configured to be thermally insulative at temperatures less than the normal operating temperature of the nuclear reactor 101, such as at temperatures less than about 900° C., less than about 800° C., less than about 700° C., less than about 600° C., less than about 500° C., or less than about 400° C. The heat transfer system 125 may be thermally conductive at temperatures greater than the normal operating temperature of the nuclear reactor 101.

Figure 1E:
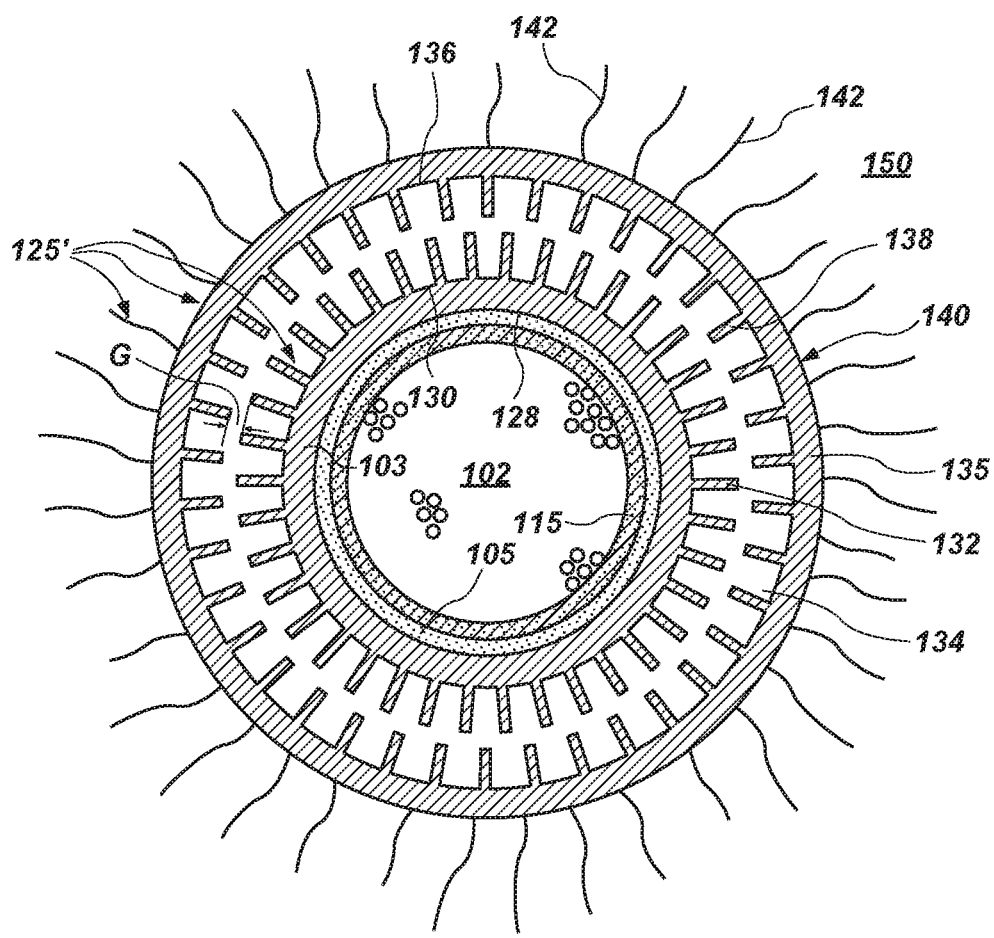
FIG. 1E is a simplified cross-sectional view of a nuclear reactor and a surrounding heat transfer system, in accordance with embodiments of the disclosure.

Although FIG. 1B and FIG. 1C have been described and illustrated as including the fins 132 having the overlap H with the fins 138, the disclosure is not so limited. In other embodiments, the fins 132 may not exhibit an overlap with the fins 138. FIG. 1E is a simplified cross-sectional view of a heat transfer system 125', in accordance with embodiments of the disclosure. The heat transfer system 125' may be substantially similar to the heat transfer system 125 of FIG. 1B, except that the fins 132 may not exhibit an overlap H with the fins 138. Rather, a gap G may be between an end portion of the fins 132 and an end portion of the fins 138. In other words, the fins 132 may be spaced from the fins 138 by the gap G in the radial direction. In some such embodiments, the heat transfer system 125' may exhibit thermally insulative properties at higher temperatures compared to heat transfer systems with an overlap H between the fins 132 and the fins 138 while exhibiting thermally conductive properties above a threshold temperature greater than a temperature at which heat transfer systems including an overlap H exhibit thermally conductive properties.

Figure 1F:
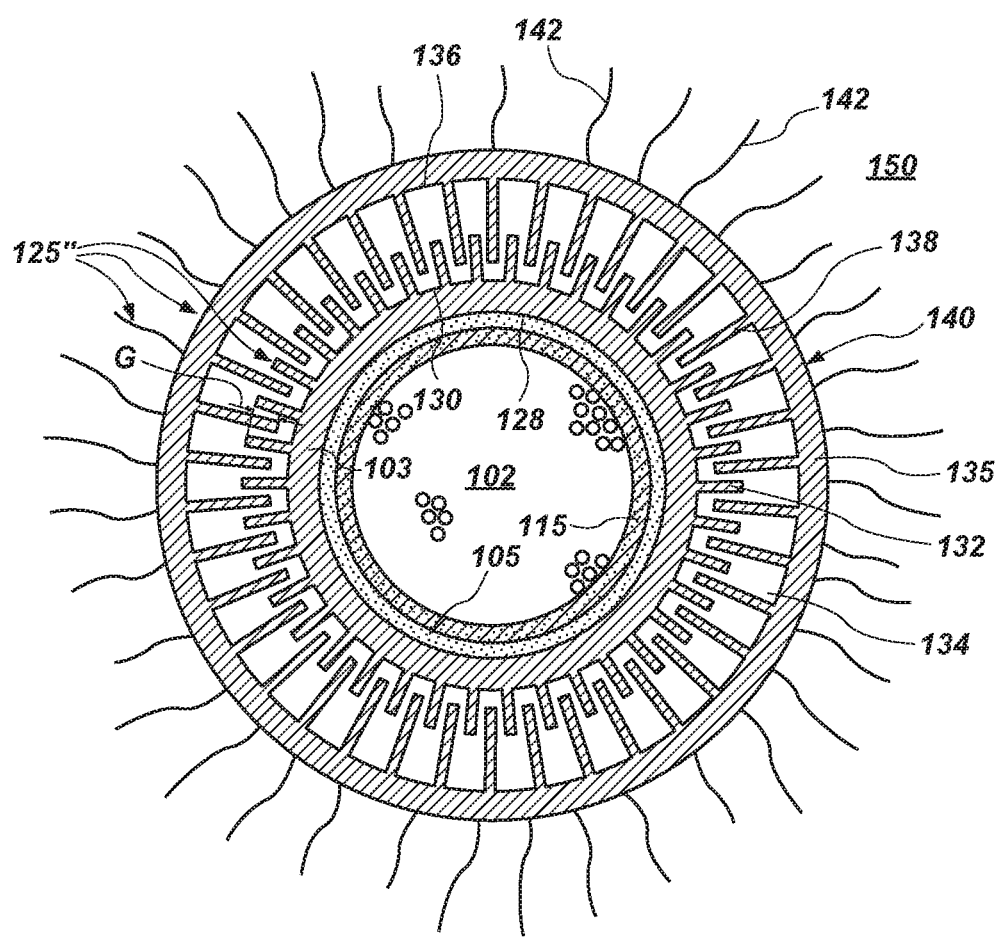
FIG. 1F is a simplified cross-sectional view of a nuclear reactor and a surrounding heat transfer system, in accordance with other embodiments of the disclosure.

In yet other embodiments, and as described above, in some embodiments, a length of the fins 132 may be different than the length of the fins 138. For example, referring to FIG. 1F, in some embodiments, a heat transfer system 125" may include fins 138 having a length that is greater than a length of the fins 132. In yet other embodiments, the fins 132 may have a length that is greater than the length of the fins 138.

Figure 1G:
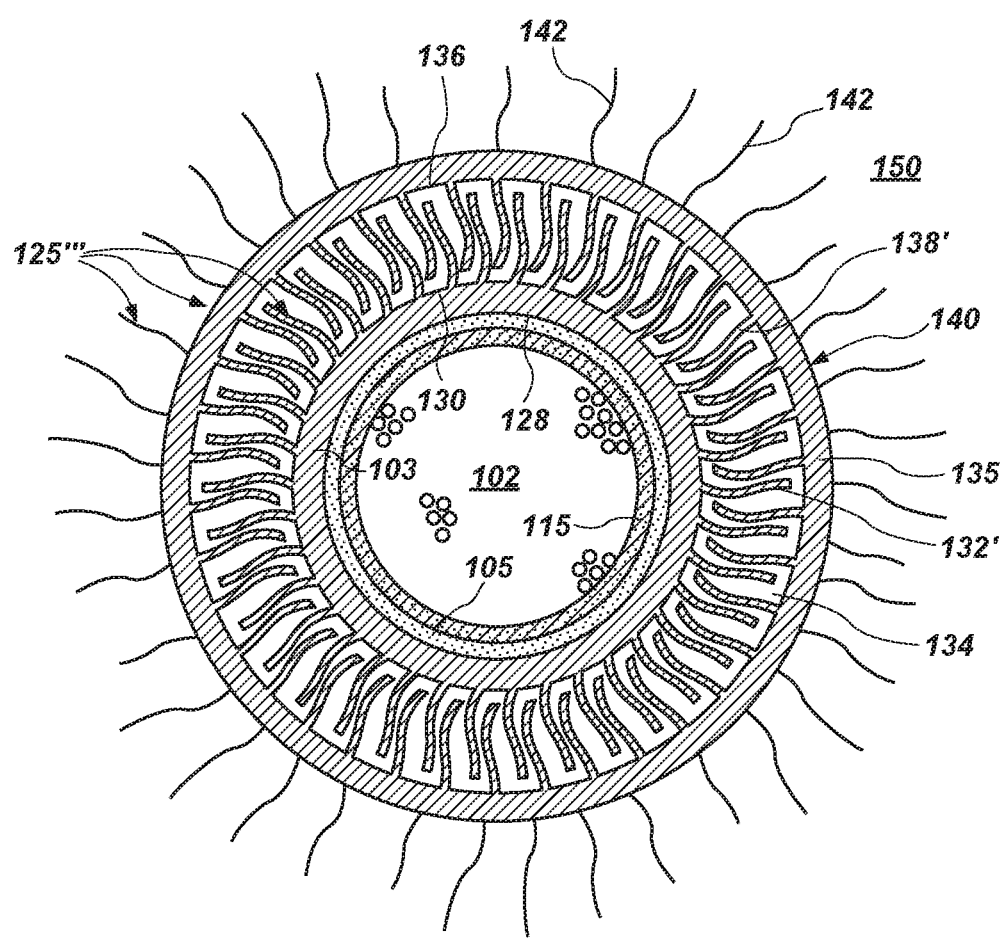
FIG. 1G is a simplified cross-sectional view of a heat transfer system including fins having a torsional shape and including arcuate surfaces, in accordance with embodiments of the disclosure.

Although the fins 132, 138 of FIG. 1B through FIG. 1F have been described and illustrated as having a particular shape, the disclosure is not so limited. FIG. 1G is a simplified cross-sectional view of a heat transfer system 125''' including fins 132', 138' having a torsional shape and including arcuate (e.g., curved) surfaces, in accordance with embodiments of the disclosure. In some embodiments, the curved surfaces of the fins 132', 138' may facilitate improved radiative heat transfer from the fins 132' to the fins 138'. With continued reference to FIG. 1G, in some embodiments, the fins 132, 138 may not overlap with each other. In some such embodiments, a gap may be between an end portion of the fins 132 and an end portion of the fins 138, as described above with reference to FIG. 1F.

Figure 1H:
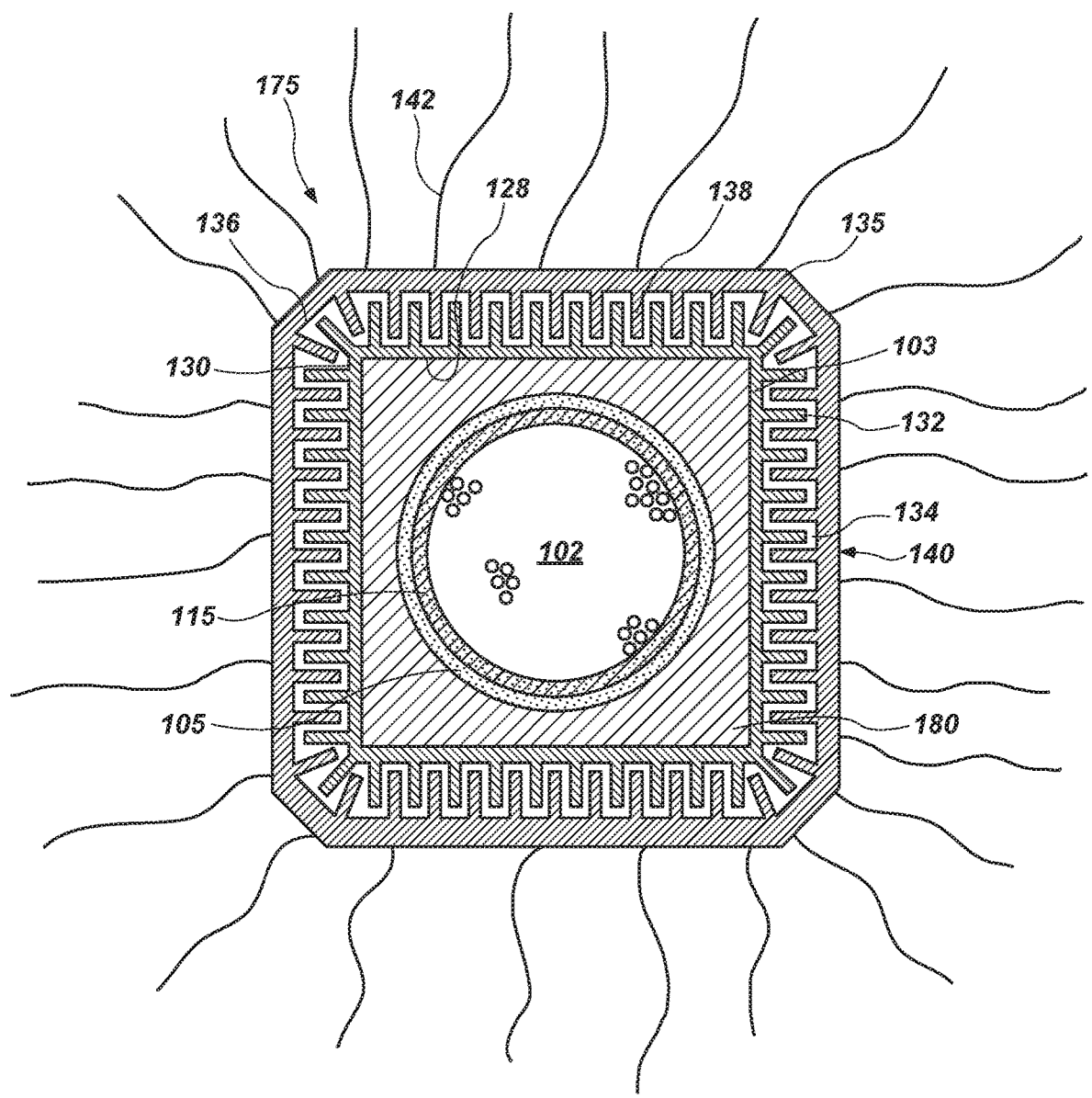
FIG. 1H is a simplified cross-sectional view of a heat transfer system disposed around an external reflector of a nuclear reactor, in accordance with embodiments of the disclosure.

In some embodiments, the heat transfer system may be disposed around an external reflector or other heat conducting structure disposed around a nuclear reactor. FIG. 1H is a simplified cross-sectional view of a heat transfer system 175 disposed around an external reflector 180 of a nuclear reactor, in accordance with embodiments of the disclosure. The nuclear reactor may include the reactor core 102, a reactor reflector 115 disposed around the reactor core 102, and a vessel 105 disposed around the reactor reflector 115. An external reflector 180 or other heat-conducting structure may be disposed around the vessel 105 and located between the vessel 105 and the heat transfer system 175. In some embodiments, the external reflector 180 exhibits a square or rectangular cross-sectional shape.

The heat transfer system 175 may be disposed around the external reflector 180. The heat transfer system 175 may be substantially similar to any of the heat transfer systems 125, 125', 125'', and 125''' described above with reference to FIG. 1A through FIG. 1G, except that the heat transfer system 175 may exhibit a square or rectangular shape corresponding to the shape of the external reflector 180.

Although FIG. 1A has been described and illustrated as including a nuclear reactor 101 including a reactor core 102 comprising a pebble bed reactor, the disclosure is not so limited. In other embodiments, the reactor core 102 may include other types of reactors, such as, for example, a molten salt reactor (MSR), an ionic salt reactor (ISR), a prismatic block nuclear reactor (e.g., a small modular reactor (SMR)), a heat pipes reactor, a pressurized water reactor (PWR), a light-water reactor (LWR), or another type of nuclear reactor.

Figure 2A:
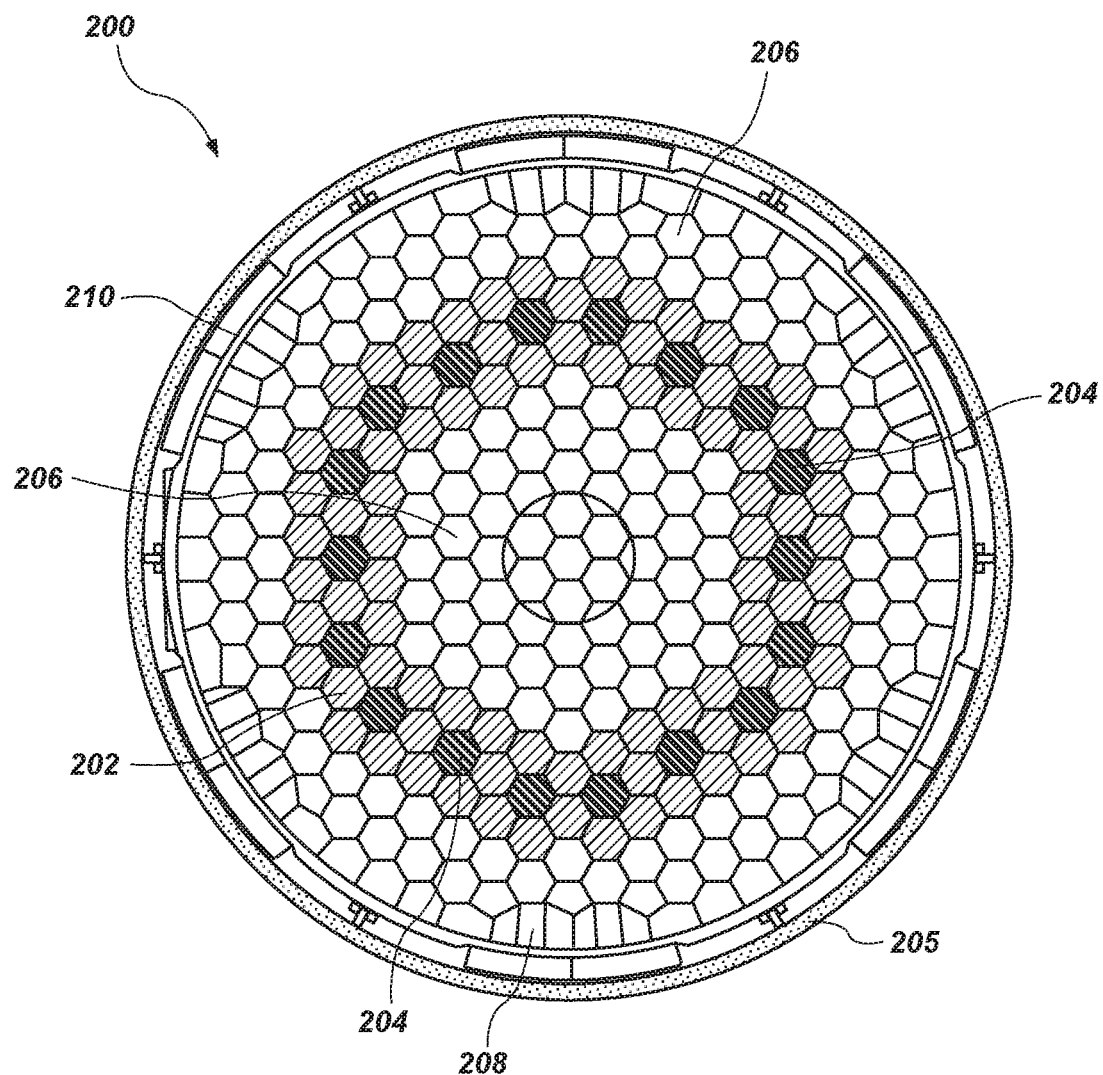
FIG. 2A is a simplified cross-sectional view of an annular nuclear reactor comprising a prismatic block annular nuclear reactor core, in accordance with embodiments of the disclosure.

FIG. 2A is a simplified cross-sectional view of a nuclear reactor 200, in accordance with embodiments of the disclosure. In some embodiments, the nuclear reactor 200 comprises a prismatic nuclear reactor. The nuclear reactor 200 may include a core barrel 210 enclosing a plurality of prismatic fuel blocks 202 (which may also be referred to as "fuel assemblies") comprising, for example, nuclear fuel materials arranged therein. A reactor vessel 205 may surround the core barrel 210. The fuel assemblies or prismatic fuel blocks 202 may be patterned to surround controlled fuel assemblies or controlled fuel blocks 204 with channels for the insertion of control rods in a hexagonal pattern. In other words, each controlled prismatic fuel block 204 may be surrounded by six prismatic fuel blocks 202. The prismatic fuel blocks 202 and the controlled fuel blocks 204 may collectively form a core of the nuclear reactor 200 and may collectively be referred to herein as the "reactor core" of the nuclear reactor 200 or the "nuclear reactor core." Each of the prismatic fuel blocks 202 and controlled prismatic fuel blocks 204 comprise one or more coolant channels. Heat generated from the prismatic nuclear fuel blocks 202 and the controlled prismatic fuel blocks 204 may be transferred to a fluid medium within the coolant channels that is, in turn, used to generate electricity.

The nuclear reactor 200 further includes replaceable reflector materials 206 arranged within a central portion of the nuclear reactor core 200 and around an outer portion of the annular pattern of the prismatic fuel blocks 202 and the controlled prismatic fuel blocks 204. The replaceable reflector materials 206 may comprise a material formulated and configured to reflect neutrons and reduce or substantially prevent stray neutrons from traveling outside the reactor core of the nuclear reactor 200. The replaceable reflector materials 206 comprise graphite, beryllium, beryllium oxide, or another reflector material. In some embodiments, the replaceable reflector material 206 comprises graphite.

A permanent reflector material 208 may be disposed around an inner portion of the core barrel 210. The permanent reflector material 208 may include one or more of the materials described above with reference to the replaceable reflector materials 206.

The nuclear reactor 200 may further include control rods comprising, for example, a reactor poison formulated and configured to stop neutron reactions within the fuel of the nuclear reactor 200. In some embodiments, the reactor poison material comprises boron carbide ($B_4C$). In addition, the periphery beyond the nuclear reactor core of the nuclear reactor 200 may include one or more neutron moderators and may further include one or both of a neutron shield and a lead gamma shield. Such materials and structures are known in the art and are, therefore, not described in detail herein.

In some embodiments, the nuclear reactor core may be substantially similar to one of the reactor cores described in U.S. Patent Application No. 2018/0226159, titled "Modular Nuclear Reactors, Fuel Structures, and Related Methods," the entire disclosure of which is hereby incorporated herein by this reference.

For example, the nuclear reactor core may include heat pipes that are heated by fuel rods embedded within graphite blocks in a reactor core, as described in U.S. Patent Application No. 2018/0226159. The heat pipes may extend out of the reactor core and into a heat exchanger block. The material heated within the heat pipes (e.g., liquid sodium or liquid potassium that has vaporized) may be cooled to heat a working fluid used to generate electricity, as described in U.S. Patent Application No. 2018/0226159. In some embodiments, the reactor core of U.S. Patent Application No. 2018/0226159 may replace the reactor core 102 of FIG. 1A. In some such embodiments, the reactor core of U.S. Patent Application No. 2018/0226159 may be surrounded by a heat transfer system structured and configured to remove excess heat from the reactor core of U.S. Patent Application No. 2018/0226159 during, for example, situations where the heat removed from the reactor core by the heat exchanger (e.g., the heat exchanger 118 (FIG. 1A)) is less than the heat generated by the reactor core.

Figure 2B:
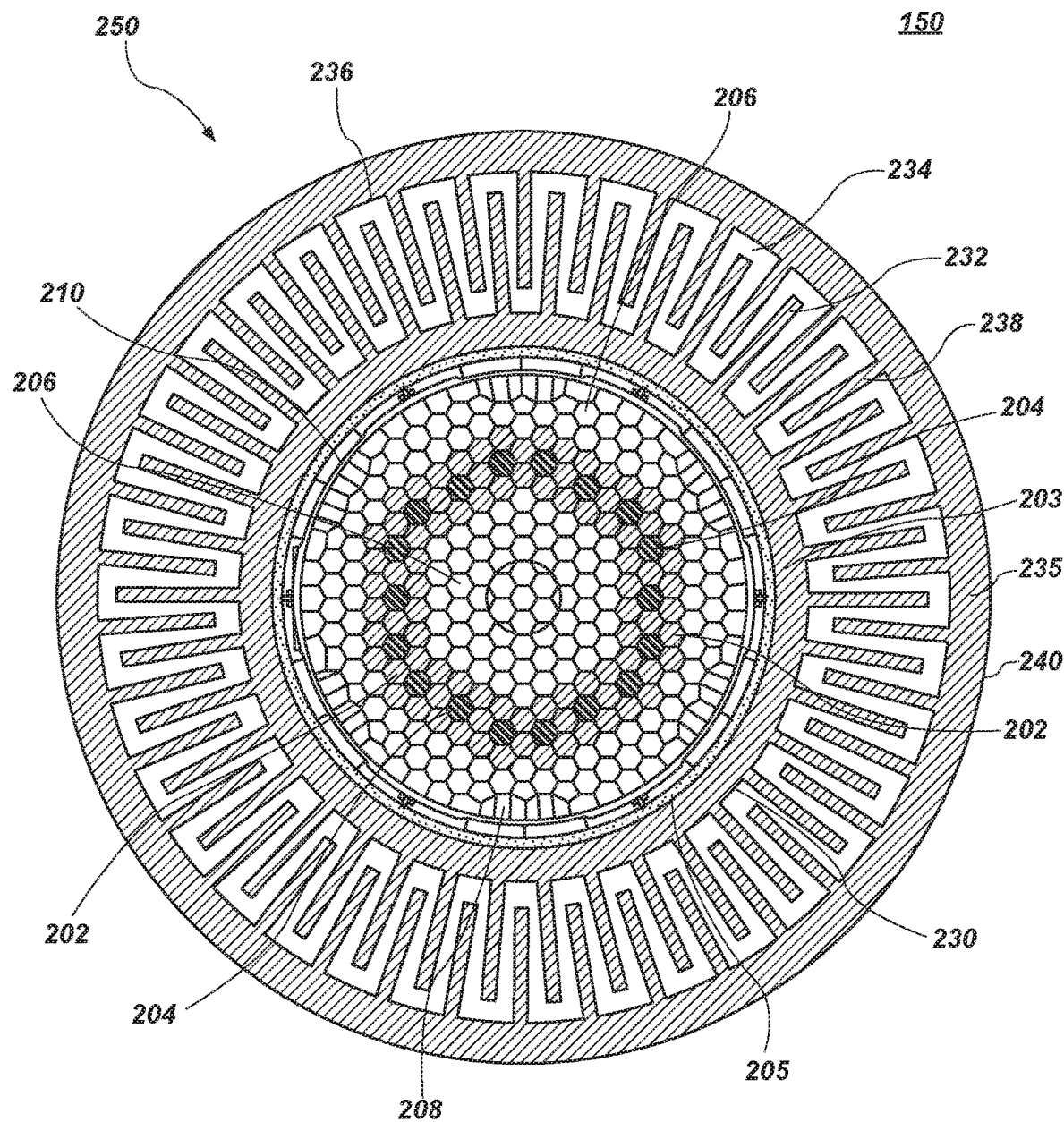
FIG. 2B is a simplified cross-sectional view of a heat transfer system surrounding a nuclear reactor, in accordance with embodiments of the disclosure.

In some embodiments, the nuclear reactor core of the nuclear reactor 200 and reflectors 206 of FIG. 2A may replace the reactor core 102 and the reflector 115 of FIG. 1B or replace the reactor core 102 and reflector 115 of FIG. 1A. In some such embodiments, the reactor core 200 of FIG. 2A may be surrounded by a heat transfer system structured and configured to remove excess heat from the nuclear reactor 200 during, for example, situations where the heat removed from the nuclear reactor 200 by the coolant fluid 114, 116 and rejected via the heat exchanger (e.g., the heat exchanger 118 (FIG. 1A) is less than the heat generated in the nuclear reactor 200). FIG. 2B is a simplified cross-sectional view of a heat transfer system 250, in accordance with embodiments of the disclosure. The heat transfer system 250 may be substantially the same as any of the heat transfer systems 125, 125', 125'', 125''', 175 described above with reference to FIG. 1B through FIG. 1H, except that the heat transfer system 250 is associated with a different nuclear reactor, such as the nuclear reactor 200. The heat transfer system 250 may include fins 232 coupled to an outer surface 230 of an inner wall 203 surrounding the reactor vessel 205. The heat transfer system 250 may include substantially the same structure described above with reference to the heat transfer systems 125, 125', 125'', 125''', 175 described above. For example, the heat transfer system 250 may include fins 232 extending from the outer surface 230 of the inner wall 203 and extending into a volume 234 between the outer surface 230 of the inner wall 203 and an inner surface 236 of an outer wall 235. Fins 238 may extend from the inner surface 236 of the outer wall 235 into the volume 234 and may alternate with the fins 232, as described above with reference to the fins 132, 138. An outer surface 240 of the outer wall 235 may be in contact with an environment 150, as described above with reference to the outer surface 140. In addition, one or more heat transfer structures may be coupled to the outer surface 240 of the outer wall 235, as described above with reference to heat transfer structures 142.

In some embodiments, the heat transfer systems (e.g., the heat transfer systems 125, 125', 125'', 125''', 175, 250) described herein may be sealed at their respective top and bottom portions. For example, the heat transfer systems may be sealed at a bottom portion thereof by a bottom support structure (e.g., a thermally insulating supporting flat structure) and sealed at a top portion thereof by a top cap structure (e.g., an insulating top structure) that may be shaped as an annular slab or as a slab with a shape conforming to the shape of the heat transfer systems. Each of the bottom support structure and the top cap structure may exhibit a shape to conform to respective bottom and top portions of the heat transfer systems. For example, each of the bottom support structure and the top cap structure may exhibit a shape corresponding to the cross-sectional shape of the bottom portion and top portion of the heat transfer systems (e.g., corresponding to the shape of the inner wall 103, the outer wall 135, and the fins 132, 138 therebetween). For example, each of the bottom support structure and the top cap structure may exhibit a shape corresponding to the cross-sectional shape of the bottom portion and top portion of the heat transfer systems (e.g., corresponding to the shape of only the inner wall 103, and only the outer wall 135 if the fins 132, 138 therebetween do not extend the full height of the inner wall 103 and outer wall 135). Each of the bottom support structure and the top cap structure may comprise a thermally insulating refractor material, such as, for example, alumina, calcium silicate materials, kaolin, and zirconia.

Accordingly, a heat transfer system may be coupled to a nuclear reactor and structured, sized, and shaped to substantially passively remove fission heat or decay heat from the reactor core by thermal radiation. The heat transfer system may provide cooling to the nuclear reactor when the nuclear reactor is lacking (e.g., without) a circulating fluid. In some embodiments, even if some of the components of the heat transfer system fail (e.g., one or more of the fins 132, 138, 132', 138', 232, 238), the heat transfer system may still remove heat from the nuclear reactor by thermal radiation. If the failure involves misalignment of fins and establishment of physical contact between fins attached to the inner wall and fins attached to the outer wall, a conduction path is established and the heat transfer system may still remove heat by radiation and conduction. By way of comparison, failure of a circulation pump or blower, or impediment of a circulation path of a conventional heat transfer system to a heat sink in a conventional reactor may result in insufficient heat removal from the conventional nuclear reactor. Accordingly, the heat transfer systems described herein may exhibit a fail-safe failure mode, meaning that the heat transfer system may continue to effectively remove heat from the nuclear reactor during emergency situations. The surface area of the fins 132, 138, 132', 138', 232, 238 and the number of the fins 132, 138, 132', 138', 232, 238 (and the associated view factor) may be selected depending on the desired heat removal capacity of the heat transfer system. The heat transfer systems described herein may be configured to facilitate safe removal of heat from reactor cores having a greater power density compared to conventional radial heat paths for conventional nuclear reactors at least partially because the heat transfer systems described herein may exhibit a higher surface area for heat removal due to the total surface area of the fins 132, 138, 132', 138', 232, 238. The heat transfer systems described herein may be used on any type of reactor core to provide the reactor core a sufficient heat transfer path to an ultimate heat sink.

The heat transfer system may be configured to function as a heat transfer regulator that is configured to shift from exhibiting insulative properties (i.e., an insulator) to exhibiting enhanced radiative heat transfer properties, depending on the temperature of the nuclear reactor and, accordingly, the corresponding temperature of the components of the heat transfer system. In some embodiments, the heat transfer system is configured to remove heat from the nuclear reactor when the temperature of the nuclear reactor exceeds a predetermined temperature and to return to exhibit thermally insulative properties when the temperature of the nuclear reactor is less than the predetermined temperature. Accordingly, the heat transfer system may be configured to operate as a heat transfer valve configured to transition between exhibiting thermally insulative properties to facilitating heat transfer from the nuclear reactor to an ultimate heat sink, depending on the temperature of the nuclear reactor.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A system for transferring heat from a nuclear reactor, the system comprising:
    a nuclear reactor comprising a nuclear fuel with a reactor core;
    a reactor reflector surrounding the reactor core;
    a reactor vessel surrounding the reactor reflector;
    a heat transfer system surrounding the reactor vessel, the heat transfer system comprising:
        an inner wall surrounding the reactor vessel;
        first fins directly contacting an outer surface of the inner wall;
        an outer wall between the inner wall and a surrounding environment; and
        second fins spaced from the first fins and directly contacting an inner surface of the outer wall and extending in a volume between the outer surface of the inner wall and the inner surface of the outer wall, the outer surface of the inner wall and the first fins configured to transfer heat from the nuclear reactor to the second fins and the inner surface of the outer wall by thermal radiation.

2. The system of claim 1, wherein the first fins comprise steel.

3. The system of claim 1, wherein the first fins comprise an integral solid core and a coating material around the core.

4. The system of claim 3, wherein the coating material comprises a different material composition than the material composition of the core.

5. The system of claim 1, wherein one or both of the first fins and the second fins exhibit a surface roughness from about 0.025 μm $R_a$ to about 50.0 μm $R_a$.

6. The system of claim 1, wherein the first fins are interdigitated with the second fins such that every other fin along a circumference of the heat transfer system is a first fin and the other of the every other fins along the circumference is a second fin.

7. The system of claim 1, wherein each first fin is spaced from a neighboring first fin by from about 0.5° to about 30°.

8. The system of claim 1, further comprising heat transfer structures on an outer surface of the outer wall.

9. The system of claim 8, wherein the heat transfer structures are in contact with at least one of the ground, water, and air.

10. The system of claim 1, wherein a length of the first fins is about the same length as the second fins.

11. The system of claim 1, wherein a length of the first fins is different from a length of the second fins.

12. The system of claim 1, wherein one of the first fins and the second fins is coated with a black coating.

13. The system of claim 1, wherein the first fins comprise a different material composition than the material composition of the second fins.

14. The system of claim 1, wherein the first fins comprise one or more of iron, copper, aluminum, nickel, manganese, a cermet material, and a carbon-carbon composite material.

15. The system of claim 1, wherein the first fins comprise an alloy of one or more of iron, nickel, and manganese.

16. The system of claim 1, wherein the first fins are coated with a hydrophilic material.

17. The system of claim 1, wherein the nuclear reactor comprises one of a pebble bed reactor, a prismatic block nuclear reactor, a light water reactor, or a nuclear reactor including heat pipes.

* * * * *